(12) United States Patent
Truan et al.

(10) Patent No.: US 8,028,938 B2
(45) Date of Patent: Oct. 4, 2011

(54) REPLACEABLE TAILGATE SPREADER

(75) Inventors: Charles Truan, Bloomfield Hills, MI (US); Paul Mandrik, Clinton Township, MI (US); James Truan, Royal Oak, MI (US)

(73) Assignee: Trynex, Inc., Warren, MI (US)

( * ) Notice: Subject to any disclaimer, the term of this patent is extended or adjusted under 35 U.S.C. 154(b) by 66 days.

(21) Appl. No.: 12/545,453

(22) Filed: Aug. 21, 2009

(65) Prior Publication Data
US 2010/0044473 A1 Feb. 25, 2010

Related U.S. Application Data

(60) Provisional application No. 61/090,717, filed on Aug. 21, 2008.

(51) Int. Cl.
*E01C 19/20* (2006.01)
*A01C 19/02* (2006.01)
*A01C 17/00* (2006.01)

(52) U.S. Cl. ........ 239/675; 239/672; 239/676; 239/681; 239/683; 239/684; 239/687

(58) Field of Classification Search .................. 239/650, 239/659, 661, 663, 668, 671, 672, 675–677, 239/679, 681, 683, 684, 687; 296/37.6, 50
See application file for complete search history.

(56) References Cited

U.S. PATENT DOCUMENTS

| 5,988,534 A * | 11/1999 | Kost et al. ...................... 239/650 |
| 6,422,490 B1 * | 7/2002 | Truan et al. .................... 239/659 |
| 2005/0252999 A1 * | 11/2005 | Truan et al. .................... 239/661 |

* cited by examiner

*Primary Examiner* — Darren W Gorman
(74) *Attorney, Agent, or Firm* — Dickinson Wright PLLC

(57) ABSTRACT

A plastic tailgate mounted spreader adapted to replace the tailgate of a vehicle. The tailgate mounted spreader has a plastic hopper having a width and height generally equal to the width and height of the vehicle tailgate. A frame having at least a top member and a bottom member supports the hopper. In the disclosed embodiment, the frame also includes side members. The top member has first and second arms extending from the top member that are adapted to be connected to the vehicle. The bottom member has first and second rods extending from the bottom member that are adapted to be connected to the vehicle and in particular to the clamps on the vehicle that control the release of the bucket. An auger is mounted within the plastic hopper to auger material to a discharge opening. The auger is mounted between the side members in the preferred embodiment. A material spinner and motor assembly are pivotally mounted below the discharge opening of the hopper so the material spinner and motor pivots with respect to the vehicle to remain generally horizontal with respect to the vehicle.

17 Claims, 7 Drawing Sheets

US 8,028,938 B2

REPLACEABLE TAILGATE SPREADER

RELATED APPLICATIONS

This application claims the benefit of U.S. Provisional Application No. 61/090,717, filed on Aug. 21, 2008.

STATEMENT REGARDING FEDERALLY SPONSORED RESEARCH

NONE

TECHNICAL FIELD

This invention relates generally to replaceable tailgate spreaders and, more particularly, to a lightweight, corrosion resistant replaceable tailgate spreader with a plastic hopper and 12 volt electric drive system.

BACKGROUND OF THE INVENTION

The present invention relates generally to spreaders for spreading materials such as for example salt, sand or fertilizer or combinations of these, and more particularly to a polyethylene replaceable tailgate mounted spreader. The spreader of the present invention mounts to the tailgate of a vehicle and in the disclosed embodiment, the spreader of the present invention replaces the tailgate on a typical vehicle, such as for example a dump truck. The replaceable tailgate spreader of the present invention can temporarily or permanently replace the standard tailgate of a vehicle.

Replaceable tailgate spreaders are known in the industry. The known replaceable tailgate spreaders are constructed of either carbon or stainless steel and have separate hydraulic motors for the augur and spinner. The carbon or stainless steel construction makes these known tailgate spreaders very heavy and expensive. The carbon steel units are also susceptible to corrosion, particularly when used to spread salt, a highly corrosive material. The need for hydraulic power is also a disadvantage. Hydraulic power requires that the vehicle to which the unit is mounted have a hydraulic power source. This limits the use of the unit to vehicles having an available hydraulic power source and is extremely costly if it needs to be added after the truck has been built. This would be typical on electric hoist dump units, which have become popular over the past several years for through put in the production environment. Additionally, hydraulic fluid can leak from the vehicle or system creating environmental problems.

Another disadvantage is that these units typically need to be professionally installed due their weight and the need for hydraulic lines to be routed to the unit. This adds cost to the overall system.

The present invention overcomes these disadvantages by providing a lightweight polyethylene replaceable tailgate spreader that is powered by the vehicles electric supply. The spreader is easily installed to a vehicle and doesn't require professional installers. A controller is also provided for controlling the various operational aspects of the spreader.

SUMMARY OF THE INVENTION

In general terms, this invention provides a plastic tailgate mounted spreader adapted to replace the tailgate of a vehicle. The tailgate mounted spreader has a plastic hopper having a width and height generally equal to the width and height of the vehicle tailgate. A frame having at least a top member and a bottom member supports the hopper. In the disclosed embodiment, the frame also includes side members. The top member has first and second arms extending from the top member that are adapted to be connected to the vehicle. The bottom member has first and second rods extending from the bottom member that are adapted to be connected to the vehicle and in particular to the clamps on the vehicle that control the release of the original tailgate. The rods keep the spinner drive level to help maintain an even spread pattern. An auger is mounted within the plastic hopper to auger material to the discharge opening. The auger is mounted between the side members in the preferred embodiment. A material spinner and motor assembly are pivotally mounted below the discharge opening of the hopper so the material spinner and motor pivots with respect to the vehicle to remain generally horizontal with respect to the vehicle.

The spreader further includes at least one flow plate mounted over the auger that is adapted to move with respect to the auger to control the flow of material to the discharge opening.

The spreader of the disclosed embodiment also includes a vibrator to facilitate the flow of material to the discharge opening. The vibrator includes a vibratory motor connected to a v-shaped plate to create a chiseling effect to produce continual flow.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
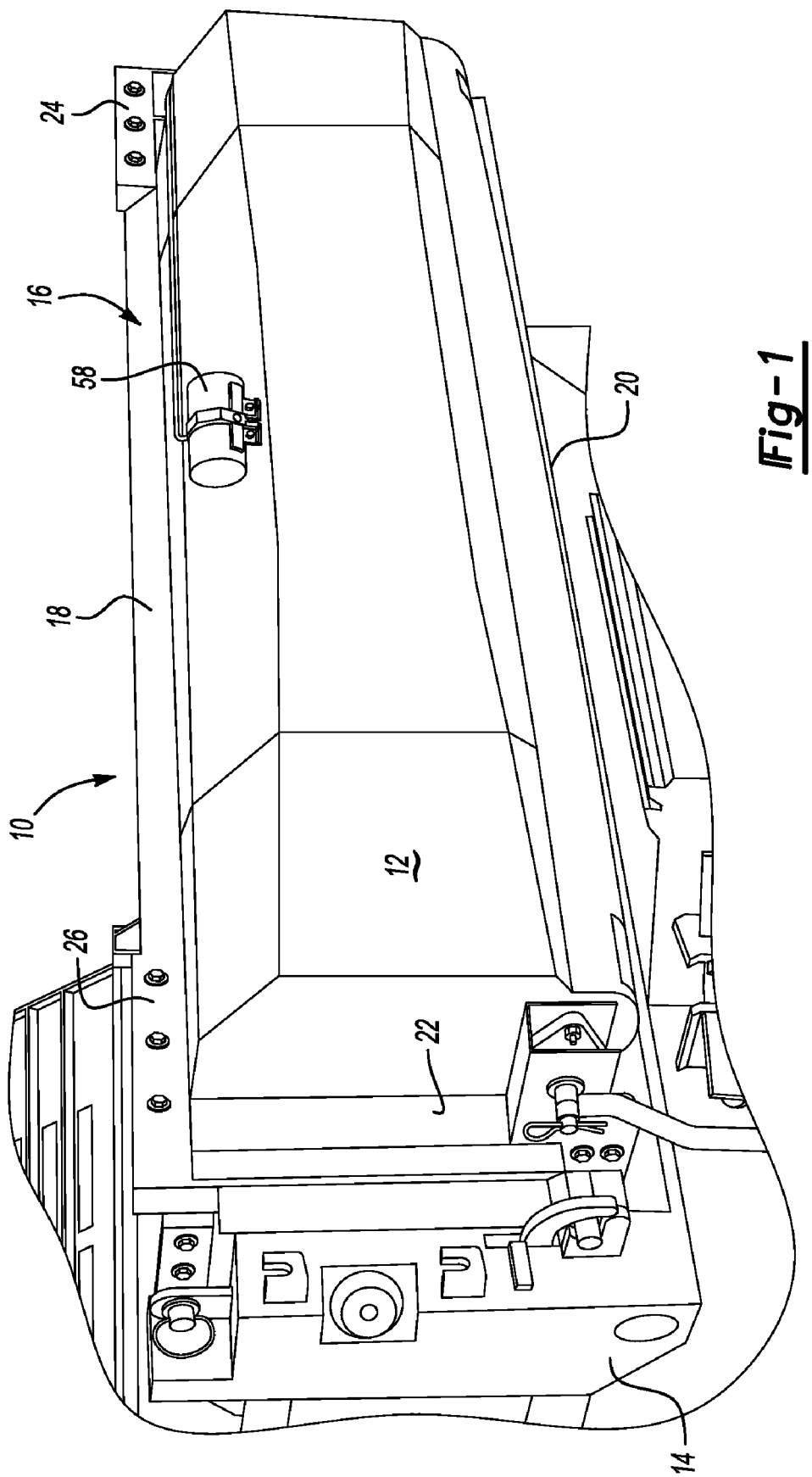
FIG. 1 is a perspective view of the replaceable tailgate spreader of the present invention mounted upon a vehicle.

With reference to FIG. 1, the tailgate spreader 10 of the present invention includes a hopper 12 which in the disclosed embodiment extends across the width of the rear opening of the dump box 14 of a vehicle such as for example a dump truck and has a height which is generally the same as the height of the dump box 14. Stated differently, the hopper 12 is about the same size as the rear opening of the dump box 14. The hopper 12 in the disclosed embodiment is made from plastic and in the preferred embodiment, polyethylene and can be made by a rotomolding process for example.

In the disclosed embodiment, the hopper 12 is bolted to a frame 16. The frame 16 supports the hopper 12 and attaches to dump box 14. In the disclosed embodiment, the frame 16 is made of standard grade steel but could be made of any number of other materials, such as for example aluminum, stainless steel, plastic, reinforced plastic etc. The main body of the frame 16 is defined by top and bottom members 18 and 20 and side members 22 and 24. In the disclosed embodiment these members are bolted together by bolts 26 but the members could be connected by other methods such as for example welded together or stamped from a sheet of material or a combination of these methods.

Figure 2:
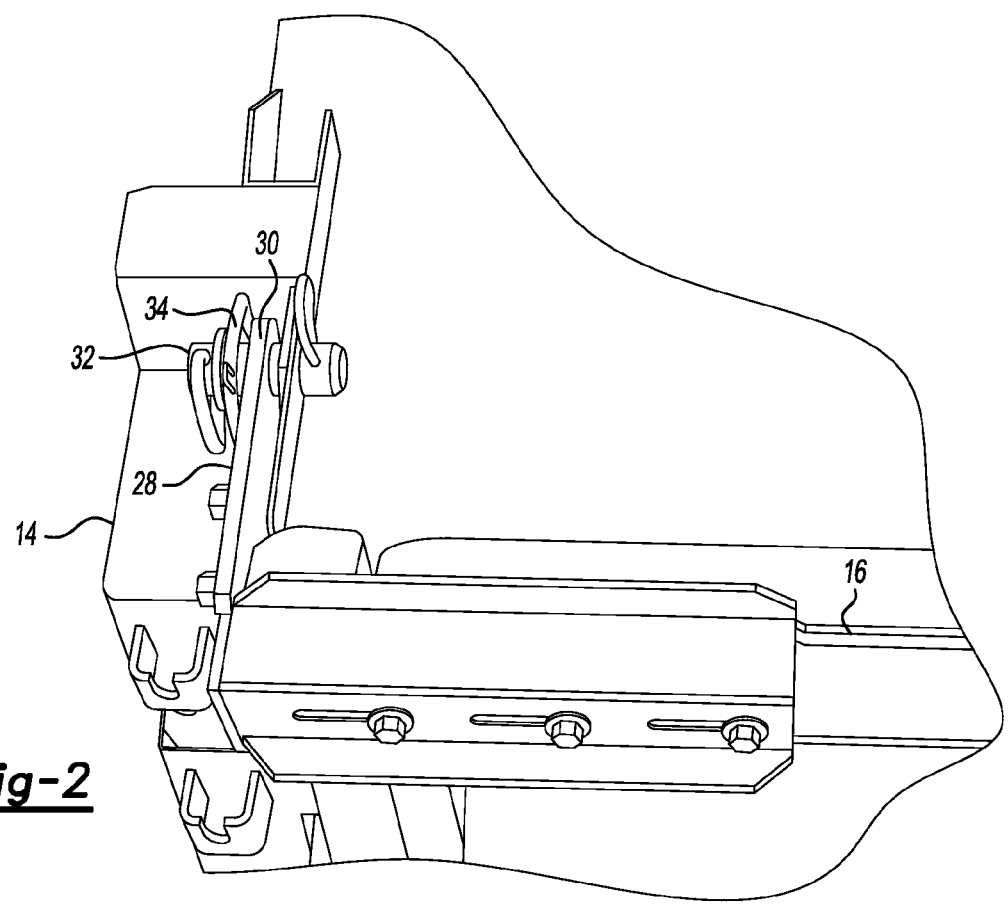
FIG. 2 is a is a top of the connecting arm of the replaceable tailgate spreader of the present invention mounted upon a vehicle.

With reference to FIG. 2, connecting arms 28 extend from the top portion of the frame 16. The arms 28 have openings 30 which are adapted to receive pins 32. The pins 32 are inserted through openings 34 in the dump box 14 that are aligned with the openings 30 in arms 28. The pins 32 extend through the openings 30 to mount the top of the frame 16 to the dump box 14. If the openings 34 do not already exist. the openings 34 can be drilled into the dump box 14 for installation of the frame 16.

Figure 3:
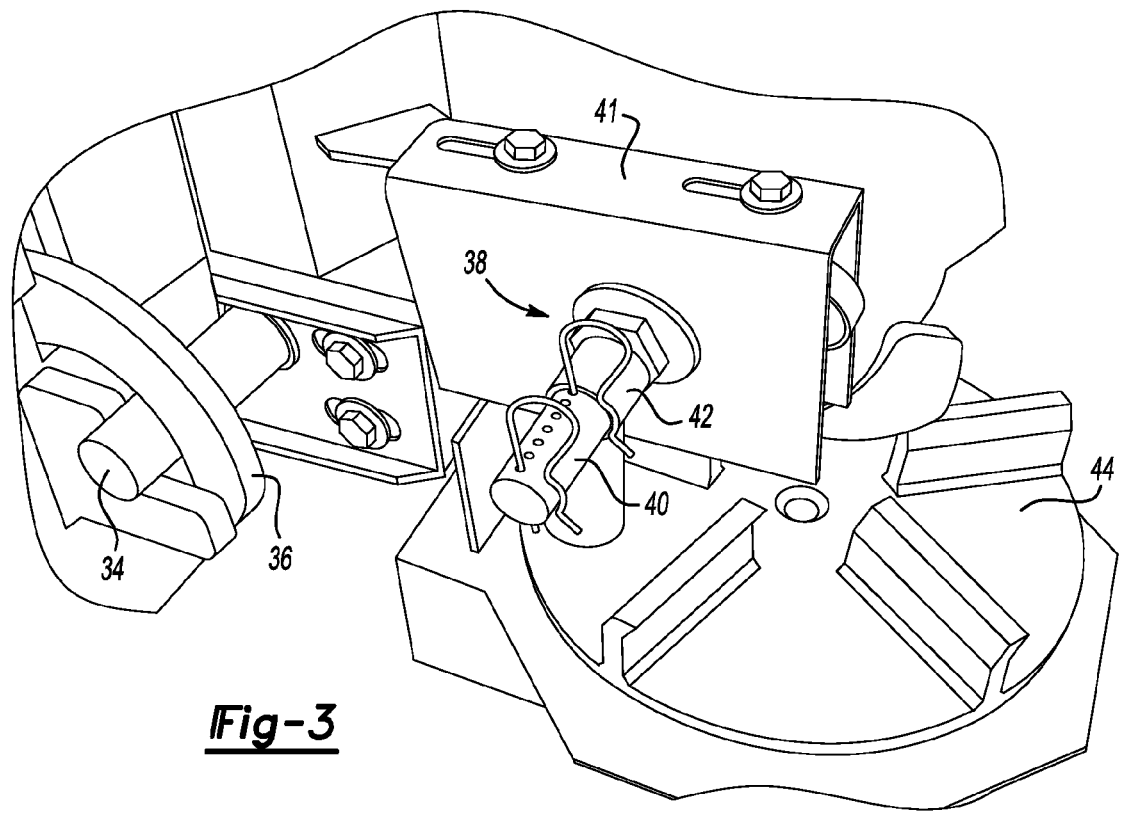
FIG. 3 is a perspective view of the spinner of the replaceable tailgate spreader of the present invention.

With reference to FIG. 3, the lower portion of the frame 16 has mounting rods 34 extending outwardly from frame 16. The rods 34 are adapted to be captured by the clamps 36 on the dump box 14. It should be appreciated by those of ordinary skill in the art that the arms 28 and rods 34 will fit most dump boxes 14, but in the event a dump box 14 would require a different configuration on the frame 16, another configuration could be used.

As will be appreciated by those of ordinary skill in the art, the tailgate spreader 10 of the present invention is very easy to install. By merely drilling two openings 34 in the dump box of the vehicle the tailgate spreader is ready for installation. The openings 30 in the arms 28 are positioned adjacent the openings 34 in the dump box 14 and the pins 32 are inserted. The lower portion of the frame 16 is then connected by capturing the rods 34 by the clamps 36 on the dump box 14.

Figure 4:
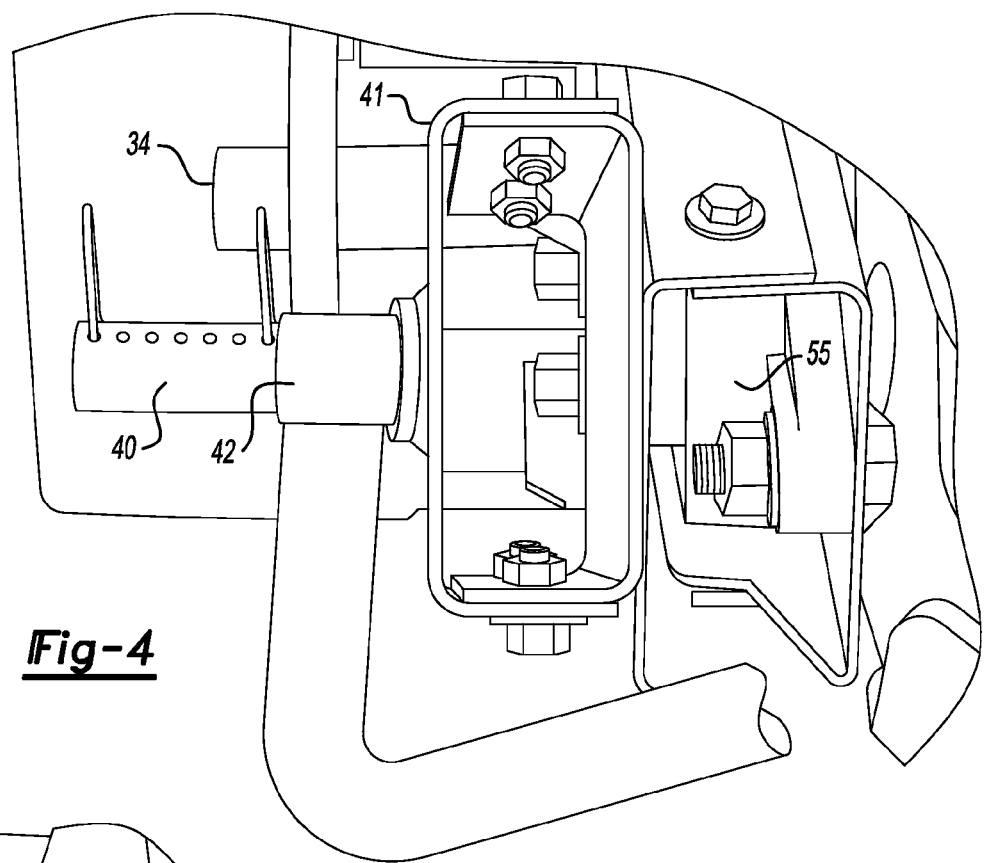
FIG. 4 is an end view of the mounting assembly for the spinner of the replaceable tailgate spreader of the present invention.
Figure 5:
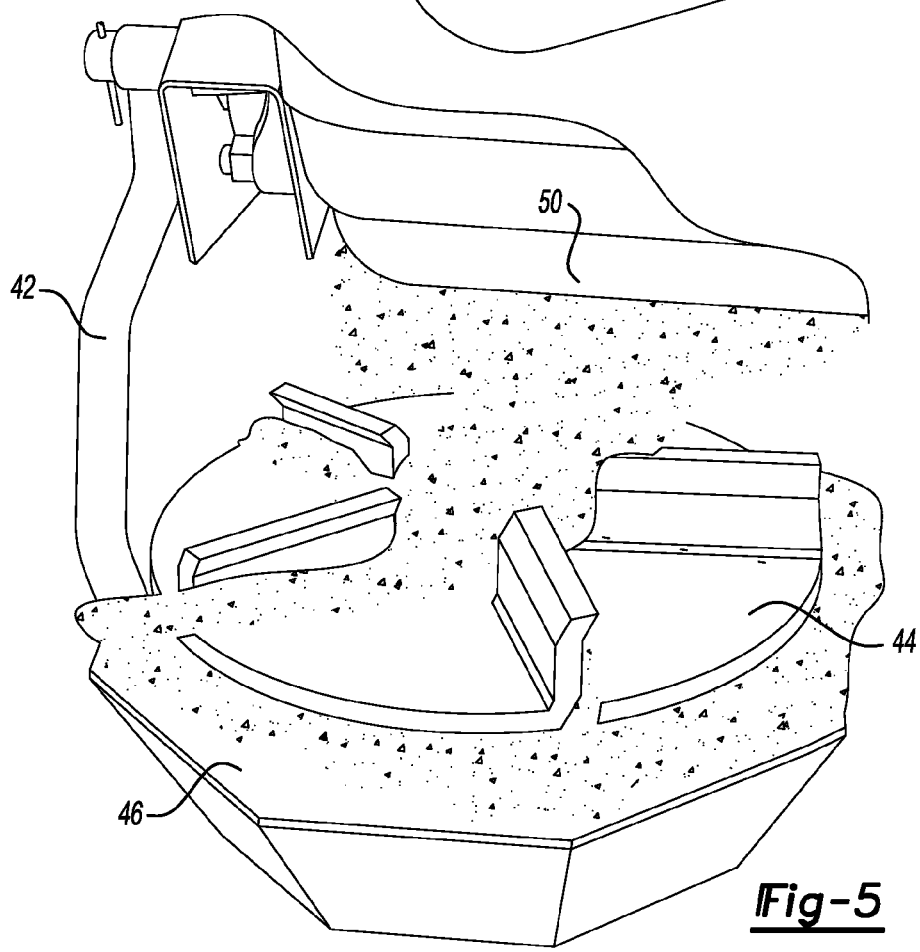
FIG. 5 is a perspective view of the spinner of the replaceable tailgate spreader of the present invention.

With reference to FIGS. 1, 3, 4 and the spreader 10 of the present invention includes a pivotable spinner assembly 38 mounted to the frame 16. A shaft 40 extends from the supporting member 41. A mounting bracket 42 is journaled upon the shaft 40. The mounting bracket 42 supports the spinner 44 and the spinner motor assembly 46. In the disclosed embodiment, the spinner motor is an electric motor which is connected to the electrical system of the vehicle through an electrical cord.

The movable spinner assembly 38 allows the spinner 44 and the spinner motor to remain generally horizontal while the hopper 12 changes its angle as the dump box 14 is raised or lowered. The spinner 44 is mounted below the discharge 50 of the hopper 12. The discharge 50 allows material from within the hopper 12 to be delivered to the spinner for spreading.

Figure 6:
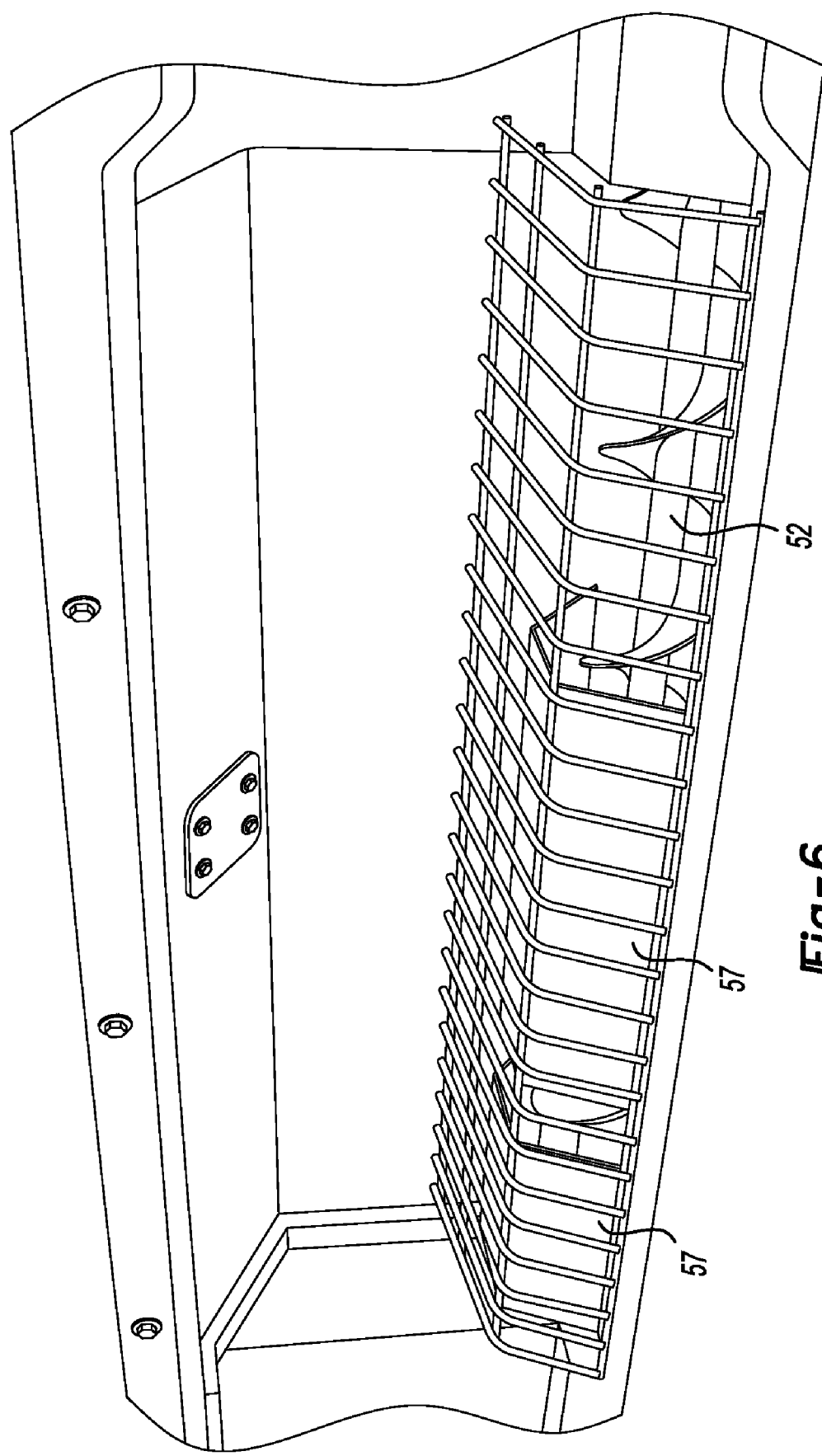
FIG. 6 is a perspective view of the hopper, auger and the moveable plates of the replaceable tailgate spreader of the present invention.
Figure 7:
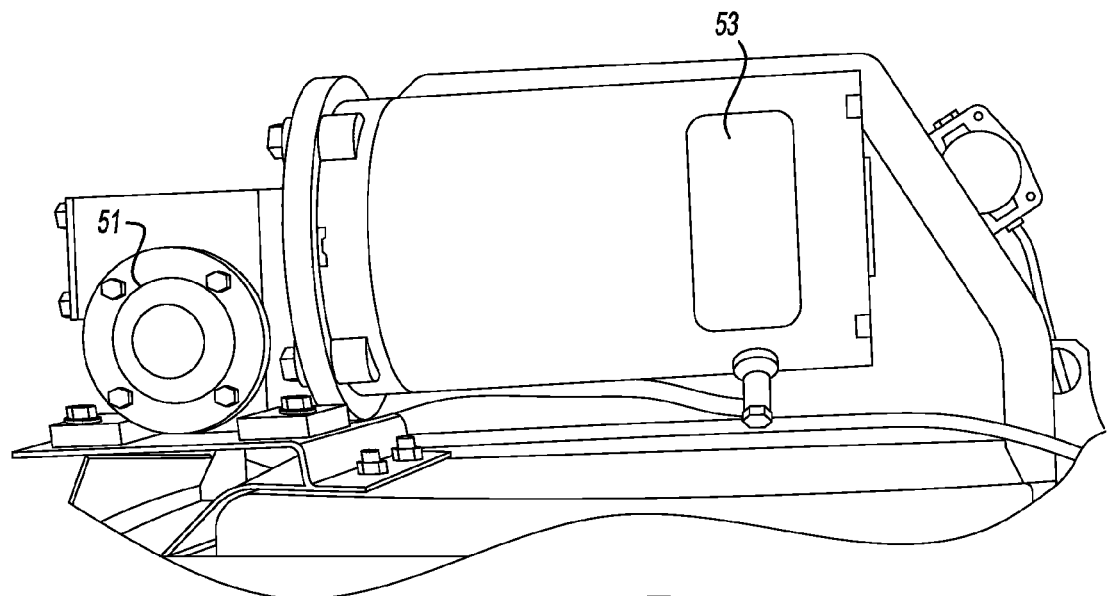
FIG. 7 is a side view of the motor and transmission of the present invention.

With reference to FIG. 6, mounted within the hopper 12 and extending between the side numbers 22 and 24 is an auger 52. One end of the auger 52 is mounted to a transmission 51 and drive motor assembly 53, see FIG. 7 and the other end is mounted to a bearing 55, see FIG. 4. The transmission 51 and drive motor assembly 53 drives the auger 52 to auger material within the hopper 12 to the discharge opening 50 of the hopper 12. In the disclosed embodiment, the auger 52 is a variable pitch auger to facilitate the movement of the material within the hopper 12 to the discharge opening 50.

With further reference to FIG. 6, movable plates 57 are provided over the auger 52 to alter the flow rate of the material being spread. Depending upon the material to be spread, the plates 57 can be used to support the material above the auger and regulate the amount of material that can reach the auger 52.

Figure 8:
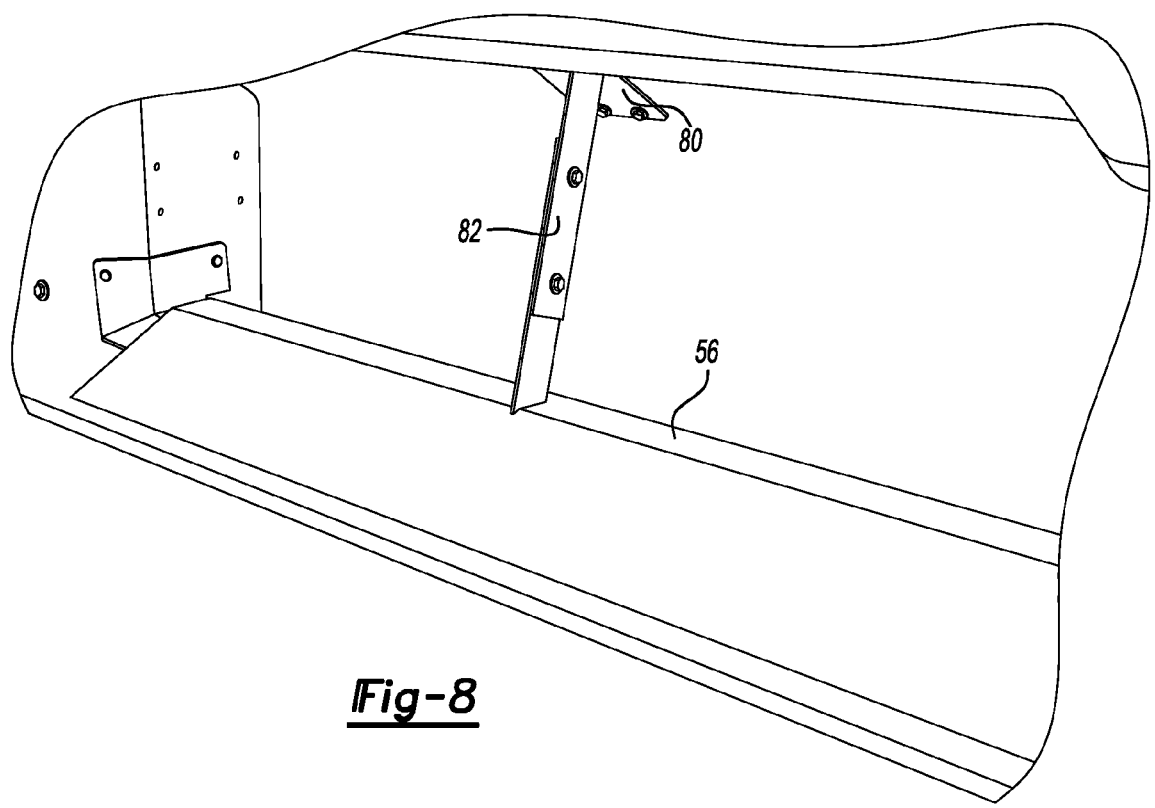
FIG. 8 is a perspective view of the vibration plate of the present invention.

In one embodiment of the present invention, a flow facilitator 56 is mounted above the auger 52, see FIG. 8. The flow facilitator 56 in the disclosed embodiment is a generally v-shaped member that is mounted over the auger 52 and generally extends along the length of the auger 52. A vibrator 58, see FIG. 1, is connected to the facilitator 56 and vibrates the flow facilitator to facilitate the flow of the material to the auger 52. In the disclosed embodiment, and with reference to FIG. 1, the vibrator 58 is mounted to the outside of the hopper 12 through bolts connected to a plate 80. The plate is connected through a rod 82 to the flow facilitator 56. Vibrations created by the vibrator 58 are transmitted through the rod 82 to the facilitator 56. The flow facilitator 56 prevents the cavitations of material within the hopper 12. This helps to empty the load evenly so the truck bed lifts.

Figure 9:
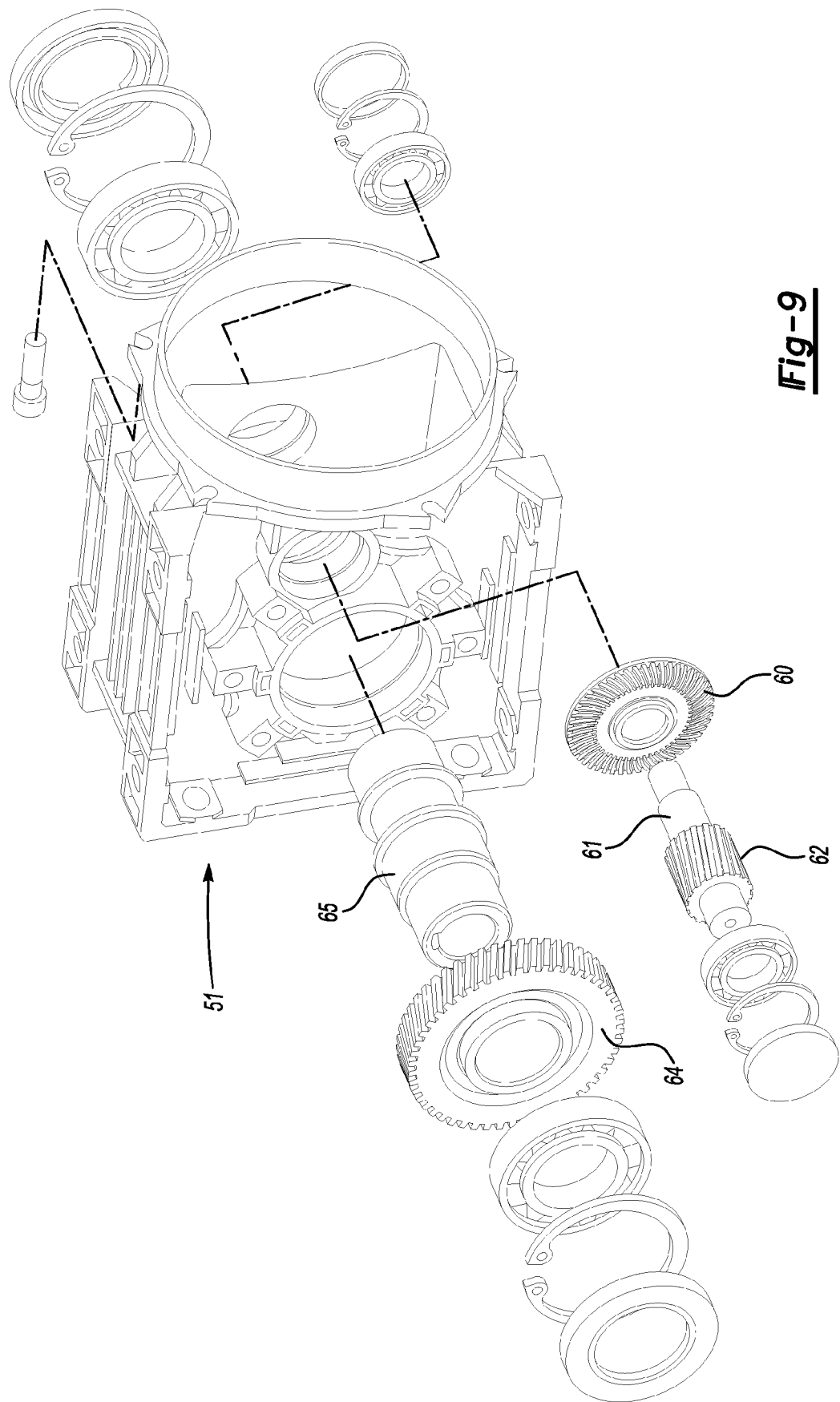
FIG. 9 is an exploded view of the transmission of the present invention.
Figure 10:
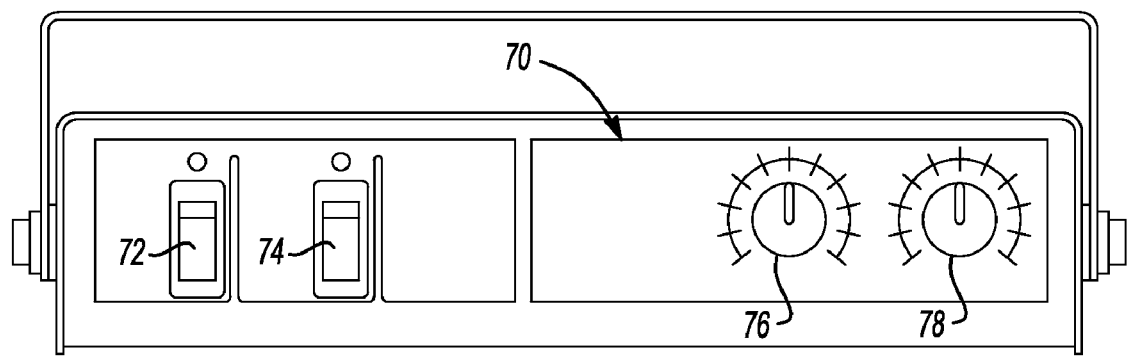
FIG. 10 is a front view of the controller of the present invention.

With reference to FIG. 9, an exploded view of transmission assembly 51 is illustrated. The motor is not shown, but would be operatively connected to the transmission assembly 51 and in particular to the gear 60. The gear 60 is mounted upon shaft 61 upon which a helical bevel gear 62 is also mounted. The helical bevel gear 62 in turn drives a helical bevel gear 64. Helical bevel gear 64 is mounted upon shaft which is then coupled to the auger 52. As will be appreciated by those of ordinary skill in the art, a number of different transmissions can be used to transmit power from the motor to the auger 52. The transmission 51 illustrated in FIG. 10 is a helical bevel geared transmission having a high efficiency bevel helical gear. With the disclosed transmission 51, the amps required to turn the auger 52 when subjected to full loads of material, for example loads over 2 yards, is cut in half when compared to typical transmissions used with material spreaders. With a typical spreader transmission, the amperage can go up to over 120 amps. With the transmission 5, the amperage pull is around 60 amps, allowing typical vehicle electric systems to easily handle the required amperage draw. The transmission 51 of the disclosed embodiments allows the use of a 12 volt vehicle system since it has a very efficient drive train which keeps amp loads to acceptable ranges.

In use, the tail gate mounted spreader 10 of the present invention is mounted to the dump box 14 by replacing the vehicle's tail gate with the spreader 10. The arms 26 are mounted to the dump box 14 by pens 32 and the rods 34 are secured to the clamps 36. The transmission and motor assembly is plugged into the vehicles electrical supply, usually through a connector box mounted to the rear of the vehicle. Material to be spread is added to the dump box 14. When spreading is desired, the dump box 14 is raised to feed material to the hopper 12. The auger 52 is driven by the transmission and motor assembly to auger material to the discharge opening 50 and deliver material to the spinner assembly 38. Since the spinner assembly 38 is moveable, it remains generally horizontal to the ground regardless of the angle of the dump box 14. The spinner assembly 38 is also powered by an electric motor that receives its power form the vehicle's electrical system. The spinner assembly 38 spins to spread the material on the surface to which it is to be applied.

In the disclosed embodiment, the transmission and motor assembly and the spinner are controlled by a controller 70 which can be mounted in the cab of the vehicle. The controller 70 has a power switch 72 for powering the transmission and motor assembly and the spinner assembly 38. A power switch 74 powers the vibrator 58. Control knob 76 allows the user to control the speed of the auger and a control knob 78 allows the user to control the spinner assembly 38.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A tailgate mounted spreader adapted to replace the tailgate of a vehicle, comprising:
    a plastic hopper having a width and height generally equal to the width and height of the vehicle tailgate, said hopper having a discharge opening;
    a frame having a top member and a bottom member, said top member having first and second arms extending from said top member and adapted to be connected to the vehicle, said bottom member having first and second rods extending from said bottom member and adapted to connected to the vehicle;
    an auger mounted within said plastic hopper to auger material to said discharge opening;
    a material spinner and motor assembly pivotally mounted below said discharge opening such that said material spinner pivots with respect to the vehicle to remain generally horizontal with respect to the vehicle.

2. The tailgate mounted spreader of claim 1, wherein said material spinner and motor assembly are supported upon a mounting bracket journaled upon a shaft that is fixed with respect to said frame, said mounting bracket is free to pivot with respect to said frame.

3. The tailgate mounted spreader of claim 1, wherein said spreader further includes at least one flow plate mounted over said auger and adapted to move with respect to said auger to control the flow of material to said discharge opening.

4. The tailgate mounted spreader of claim 1, further including a vibrator to facilitate the flow of material to said discharge opening.

5. The tailgate spreader of claim 4, wherein said vibrator includes a vibration plate which extends over said discharge opening.

6. The tailgate spreader of claim 5, wherein said plate extends laterally over said auger.

7. The tailgate spreader of claim 5, wherein said vibration plate is V-shaped.

8. The tailgate spreader of claim 6, further including a vibratory motor operatively coupled to said plate.

9. The tailgate spreader of claim 1, further including a transmission and motor, said transmission couples said auger to said motor.

10. The tailgate spreader of claim 9, wherein said transmission includes helical bevel gears.

11. A tailgate mounted spreader adapted to replace the tailgate of a vehicle, said vehicle having a tailgate and a bed, said tailgate spreader comprising:
    a plastic hopper having a width and height generally equal to the width and height of the vehicle tailgate, said hopper having a material opening for receipt of material to be spread, said material opening being adapted to face said bed of said vehicle and receive material to be spread from said bed and a discharge opening;
    a frame having a top member and a bottom member, said top member having first and second arms extending from said top member and adapted to be connected to the vehicle, said bottom member having first and second rods extending from said bottom member and adapted to be connected to the vehicle;
    an auger mounted within said plastic hopper to auger material to said discharge opening;
    a material spinner and motor assembly pivotally mounted below said discharge opening such that said material spinner pivots with respect to the vehicle to remain generally horizontal with respect to the vehicle; and
    a motor assembly to drive said auger.

12. The tailgate mounted spreader of claim 11, wherein said material spinner and motor assembly are supported upon a mounting bracket journaled upon a shaft that is fixed with respect to said frame, said mounting bracket is free to pivot with respect to said frame.

13. The tailgate mounted spreader of claim 11, wherein said spreader further includes at least one flow plate mounted over said auger and adapted to move with respect to said auger to control the flow of material to said discharge opening.

14. The tailgate mounted spreader of claim 11, further including a vibrator to facilitate the flow of material to said discharge opening.

15. The tailgate spreader of claim 14, wherein said vibrator includes a plate which extends laterally over said auger.

16. The tailgate spreader of claim 15, wherein said plate is V-shaped.

17. The tailgate spreader of claim 11, wherein said motor assembly to drive said auger includes a transmission and motor, said transmission couples said auger to said motor, said transmission includes helical bevel gears.

* * * * *